US011272414B2

(12) United States Patent
Åström et al.

(10) Patent No.: US 11,272,414 B2
(45) Date of Patent: Mar. 8, 2022

(54) BROKERING SERVICE APPARATUS AND METHOD THEREIN FOR ASSISTING ROAMING IN MULTIPLE MESH NETWORKS

(71) Applicant: Telefonaktiebolaget L M Ericsson (publ), Stockholm (SE)

(72) Inventors: Magnus Åström, Lund (SE); Bengt Lindoff, Bjärred (SE); Per Persson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1721 days.

(21) Appl. No.: 14/423,360

(22) PCT Filed: Feb. 3, 2015

(86) PCT No.: PCT/EP2015/052146
§ 371 (c)(1),
(2) Date: Feb. 23, 2015

(87) PCT Pub. No.: WO2016/124223
PCT Pub. Date: Aug. 11, 2016

(65) Prior Publication Data
US 2016/0345215 A1 Nov. 24, 2016

(51) Int. Cl.
*H04W 36/14* (2009.01)
*H04W 48/18* (2009.01)
(Continued)

(52) U.S. Cl.
CPC ......... *H04W 36/14* (2013.01); *H04L 67/2809* (2013.01); *H04M 15/805* (2013.01);
(Continued)

(58) Field of Classification Search
None
See application file for complete search history.

(56) References Cited

U.S. PATENT DOCUMENTS

| 7,974,620 B1 * | 7/2011 | Singh | H04W 48/18 455/432.1 |
| 8,149,715 B1 * | 4/2012 | Goel | H04L 45/123 370/238 |

(Continued)

FOREIGN PATENT DOCUMENTS

| CN | 101047981 A | 10/2007 |
| EP | 1718093 A1 | 11/2006 |

(Continued)

OTHER PUBLICATIONS

Barnickel, Johannes et al., "Security and Privacy for WLAN Roaming with per-connection Tariff Negotiation", 36th Annual IEEE Conference on Local Computer Networks, Oct. 4, 2011, 424-431.

(Continued)

*Primary Examiner* — Andre Tacdiran
(74) *Attorney, Agent, or Firm* — Murphy, Bilak & Homiller, PLLC

(57) ABSTRACT

A brokering service apparatus (400) and method therein (150) for assisting a first node (111) to roam in multiple mesh networks (100) are disclosed. The multiple mesh networks (100) comprises a first network (110) comprising a first node (111) and a gateway node (113) and a second network (120) comprising a gateway node (123). The multiple mesh networks (100) further comprises a mesh node (140, 141) which may belong to either the first network (110), the second network (120) or a third network (130). The brokering service apparatus receives a connection request associated with the first node 111 and the first network (110), the connection request is sent by the first node (111) via the mesh node (140). The brokering service identifies the first network (110) and data requirements for the first node (111) and negotiates a roaming contract between a first NMS (160) associated with the first network (110) and at least a second NMS (170) associated with the
(Continued)

second network (120). When the roaming contract is established, the brokering service transmits a roaming accept message to at least the second NMS (170) of the second network (120).

16 Claims, 3 Drawing Sheets

(51) Int. Cl.
*H04M 15/00* (2006.01)
*H04W 4/24* (2018.01)
*H04L 29/08* (2006.01)
*H04W 12/04* (2021.01)
*H04W 24/08* (2009.01)
*H04W 84/18* (2009.01)
*H04W 36/26* (2009.01)
*H04L 67/562* (2022.01)

(52) U.S. Cl.
CPC ......... *H04M 15/8038* (2013.01); *H04W 4/24* (2013.01); *H04W 12/04* (2013.01); *H04W 24/08* (2013.01); *H04W 48/18* (2013.01); *H04W 36/26* (2013.01); *H04W 84/18* (2013.01)

(56) References Cited

U.S. PATENT DOCUMENTS

| | | | |
|---|---|---|---|
| 2005/0130660 A1* | 6/2005 | Park | H04W 36/26 455/436 |
| 2005/0190778 A1 | 9/2005 | Ozluturk et al. | |
| 2007/0005962 A1* | 1/2007 | Baker | G06Q 40/00 713/168 |
| 2007/0087751 A1* | 4/2007 | Voyer | H04W 36/26 455/436 |
| 2007/0206537 A1 | 9/2007 | Cam-Winget et al. | |
| 2008/0040481 A1* | 2/2008 | Joshi | H04L 12/14 709/226 |
| 2008/0198822 A1* | 8/2008 | Magnusson | H04L 12/14 370/338 |
| 2010/0075669 A1* | 3/2010 | Sparks | H04W 8/183 455/433 |
| 2010/0316029 A1* | 12/2010 | Kappler | H04L 41/0813 370/338 |
| 2011/0117907 A1* | 5/2011 | Hooli | H04W 72/02 455/422.1 |
| 2011/0130117 A1* | 6/2011 | Fan | H04M 15/00 455/411 |
| 2011/0130118 A1* | 6/2011 | Fan | H04M 15/46 455/411 |
| 2012/0034916 A1* | 2/2012 | Hu | H04W 28/24 455/432.1 |
| 2013/0163407 A1* | 6/2013 | Sinha | H04L 45/302 370/217 |
| 2013/0178150 A1* | 7/2013 | Park | H04W 84/12 455/11.1 |
| 2013/0235792 A1* | 9/2013 | Abraham | H04B 7/15 370/315 |
| 2014/0126460 A1* | 5/2014 | Bienas | H04W 74/002 370/315 |
| 2014/0128060 A1* | 5/2014 | Vashi | H04W 8/12 455/432.1 |
| 2014/0169265 A1* | 6/2014 | Park | H04W 40/22 370/315 |
| 2014/0279166 A1* | 9/2014 | Bilik | G06Q 30/0611 705/26.4 |
| 2015/0065125 A1* | 3/2015 | Patel | H04W 8/12 455/433 |
| 2015/0256993 A1* | 9/2015 | Bellamkonda | H04W 8/12 455/433 |
| 2016/0135109 A1* | 5/2016 | Hampel | H04W 4/70 370/315 |

FOREIGN PATENT DOCUMENTS

| | | |
|---|---|---|
| EP | 2051549 A1 | 4/2009 |
| WO | 2009006071 A2 | 1/2009 |
| WO | 2010028278 A2 | 3/2010 |

OTHER PUBLICATIONS

Berg, Miguel et al., "A Concept for Public Access to Privately Operated Cooperating Local Access Points", IEEE 2005 61st Vehicular Technology Conference, May 30, 2005, 2959-2963.
ETSI, "Digital cellular telecommunications system (Phase 2+) (GSM); Universal Mobile Telecommunications System (UMTS); Service aspects; Charging and billing (3GPP TS 22.115 version 5.2.0 Release 5)", ETSI TS 122 115 V5.2.0, Mar. 2002, 1-24.
3GPP, "3rd Generation Partnership Project; Technical Specification Group Services and System Aspects; Service aspects; Charging and billing (Release 13)", 3GPP TS 22.115 V13.0.0, Dec. 2013, 1-29.
Glass, S. et al., "Mobile IP Authentication, Authorization, and Accounting Requirements", Internet Engineering Task Force, Mobile IP Working Group, Internet Draft, Jun. 1, 2000, 1-26.

* cited by examiner

BROKERING SERVICE APPARATUS AND METHOD THEREIN FOR ASSISTING ROAMING IN MULTIPLE MESH NETWORKS

TECHNICAL FIELD

Embodiments herein relate to a brokering service apparatus and a method therein. In particular, they relate to assisting a network node to roam in multiple mesh networks.

BACKGROUND

Wireless communication networks usually suffer from some problems, e.g. limited cover range and unreliable communications. As a result, data is sometimes received corrupted at a receiver end. As a means to mitigate the cover range limitations, mesh networks have been developed. A Wireless Mesh Network (WMN) is a communications network made up of radio nodes organized in a mesh topology. In a wireless mesh network, intermediary relay nodes relay data from a source, i.e. a sender, to data's destination, i.e. a receiver. In this way, the covered range of a node in the mesh network is extended. Wireless mesh networks may be implemented with various wireless technology including IEEE 802.11, IEEE 802.15, IEEE 802.16, cellular technologies or combinations of more than one type.

Connectivity of a mesh network describes a ratio in which network nodes may reach other nodes in the mesh network. In the case of a fully connected mesh network, all nodes are able to reach all other nodes.

Mesh Device to Device (D2D) networks, for example sensor or meter networks, such as for electricity or water meters, or for containers loaded on a ship or a shipyard, in which data is reported to a server via a mesh gateway node, are becoming more and more common. However such D2D networks are required to be fully connected, i.e. all nodes in the network must be able to connect to its gateway node either directly or through other nodes. Some nodes in such a D2D network, e.g. a first node in a first network, will connect to its gateway node through a single relay node in the first network. This makes the first node entirely dependent on said relay node. In the event of such a relay node dropping out of the first network, e.g., due to battery outage or the relay node being moved, the first node becomes detached and may no longer be able to connect to the server through the first network.

Mesh networks may be dynamic in the sense that individual nodes may move within a network, however the network itself is usually static in the sense that it covers a relatively fixed geographical area. A node that for some reason falls outside its home network is detached and hence unable to communicate with its server. For example, a sensor node in a container may belong to a network which is out of reach when the container stays in a foreign harbor.

Multiple mesh networks may exist in parallel within the same geographical area. For example an electricity metering network operates independently from a water metering network. Multiple mesh networks may also exist in parallel with current wireless communication systems, e.g. cellular communications networks comprising Second/Third Generation (2G/3G) network, 3G Long Term Evolution (LTE) network, 4G network, Worldwide interoperability for Microwave Access (WiMAX) network, Wireless Local Area Network (WLAN) etc. as well as the emerging 5G, i.e. the 5th generation mobile networks. In the 5G wireless communication system, machine-to-machine communication or Machine-Type Communications (MTC) is one of the major research projects. Commonly, MTC in sensor or meter networks are performed towards a single recipient which is a server receiving sensor or metering data. As a consequence, the only relevant connection, on an applications level for a node in such a network, is with the server for receiving its data. In this case the network is fully connected if all nodes are able to communicate with said server.

When a node is detached from its home network, it may be beneficial to, instead of being detached from to its own home network, connect to a second node in a parallel second network, i.e. to roam in a roaming network, and thereby still being able to connect to the home network. However, the home and roaming networks may belong to different operators, may using different Radio Access Technologies (RATs), may using different frequency bands both licensed or unlicensed etc. Furthermore, there may also be several available roaming networks for the detached node. This implies that the cost of attaching a node may differ significantly from one network to another network. Thus roaming costs may be decided on an individual basis. Therefore roaming in multiple mesh networks is different compared to roaming principles in current cellular networks, where a single RAT is used in each network and there is only a single connection between a network gateway node and a user equipment. Hence roaming methods in the current cellular networks may not be able to handle roaming in multiple mesh networks.

SUMMARY

Therefore it is an object of embodiments herein to provide an improved way of roaming between multiple mesh networks.

According to a first aspect of embodiments herein, the object is achieved by a method of a brokering service for assisting a first node to roam in multiple mesh networks. The multiple mesh networks comprises a first network comprising a first node and a gateway node and a second network comprising a gateway node. The multiple mesh networks further comprises a mesh node. The mesh node may belong to either the first network, the second network or a third network. The brokering service receives a connection request associated with the first node and the first network, and the connection request is sent by the first node via the mesh node. The brokering service identifies the first network and data requirements for the first node. The brokering service further negotiates a roaming contract between a first Network Management Service (NMS) associated with the first network and at least a second NMS associated with the second network. When the roaming contract is established, the brokering service transmits a roaming accept message to at least the second NMS of the second network.

According to a second aspect of embodiments herein, the object is achieved by a brokering service apparatus for assisting a first node to roam in multiple mesh networks. The multiple mesh networks comprises a first network comprising a first node and a gateway node and a second network comprising a gateway node. The multiple mesh networks further comprises a mesh node. The mesh node may belong to either the first network, the second network or a third network. The brokering service apparatus is configured to receive a connection request associated with the first node and the first network, and the connection request is sent by the first node via the mesh node. The brokering service apparatus is further configured to identify the first network and data requirements for the first node and negotiate a roaming contract between a first Network Management Service (NMS) associated with the first network and at least a second NMS associated with the second network. When the roaming contract is established, the brokering service apparatus is further configured to transmit a roaming accept message to at least the second NMS of the second network.

According to embodiments herein, the brokering service assists the first node to roam in the multiple mesh networks by negotiating a roaming contract between its home network and other roaming networks. Since the cost of attaching a node may differ significantly depending e.g., on the number of intermediate relay nodes that are necessary to pass in order to reach its home server, or the load in the roaming network, or the frequency bands or RATs used between the intermediate nodes, roaming costs may be decided on an individual basis. By introducing the roaming brokering service, it allows the detached first node to connect to its server through the roaming network. The brokering service receives a connection request from the first node and thereby knowing a roaming is required for the first node. The brokering service will then negotiate a roaming contract between different available roaming networks, e.g. negotiate the price for said roaming based on, e.g. the number of relay nodes, amount of data etc.

By allowing for roaming, detached nodes may connect to their servers through other mesh networks thus increasing connectivity and reliability. By introducing the roaming brokering service, roaming through other networks may be handled efficiently and reliably, eliminating the need for mesh network operators to make individual agreements with all other mesh network operators.

Thus, embodiments herein provide an efficient and reliable brokering service for assisting a node to roam in multiple mesh networks, thereby improving connectivity and reliability of the multiple mesh networks.

BRIEF DESCRIPTION OF THE DRAWINGS

Examples of embodiments herein are described in more detail with reference to attached drawings in which.

DETAILED DESCRIPTION

Figure 1:
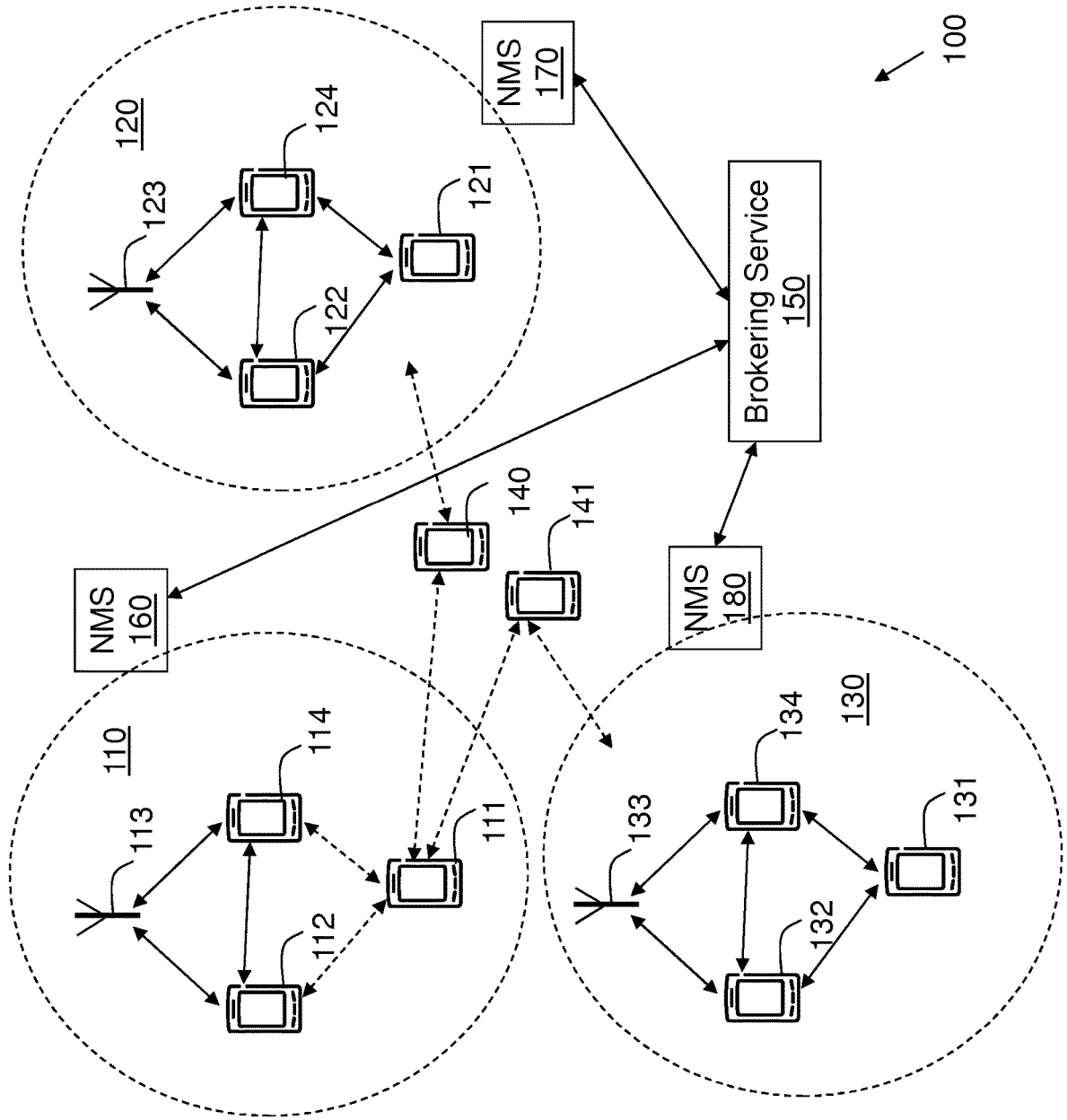
FIG. 1 is a schematic diagram illustrating an example of multiple mesh networks.

FIG. 1 depicts an example of multiple mesh networks 100 in which embodiments herein may be implemented. The multiple mesh networks 100 comprises one or more mesh networks, where a first network 110, a second network 120 and a third network 130 are shown. Each mesh network 110, 120, 130 may comprise a number of network nodes. For example, the first network 110 may comprise network nodes 111, 112, 113 and 113, the second network 120 may comprise network nodes 121, 122, 123 and 124 and the third network 130 may comprise network nodes 131, 132, 133 and 134.

The first, second and third networks 110, 120, 130 may be various networks, e.g. mesh D2D networks, sensor or meter networks, WLAN, any 2G/3G/4G/5G networks, LTE networks, Wideband CDMA (WCDMA), Wimax or combinations of more than one type. Communications between respective network nodes in the mesh network may be of different RATs, and the radio communication may use different frequency bands both licensed, e.g. LTE D2D communications may be used between the network nodes, or unlicensed, e.g. WIFI direct, Bluetooth may be used between the network nodes, or even licensed assisted LTE D2D may be used between the network nodes, i.e. LTE is used in unlicensed, for instance, Industrial, Scientific and Medical (ISM) radio bands, which is possible supported by an LTE primary carrier in licensed spectrum. In all cases, however, it may assume that each mesh network 110, 120, 130 comprises a gateway node, e.g. the network node 113 in the first network 110, the network node 123 in the second network 120 and the network node 133 in the third network 130 may be gateway nodes. The gateway node is a network node, e.g. eNode B in LTE networks, Base Station (BS) in cellular networks or Access Point (AP) in WLAN, with connection to respective servers via Internet. The other network nodes in the mesh network, e.g. the network nodes 111, 112 and 114 in the first network 110, the network nodes 121, 122 and 124 in the second network 120 and the network nodes 131, 132 and 134 in the third network 130 may, e.g. be any types of device with wireless communication capability, or any other radio network units capable to communicate over a radio link in a wireless communications network, e.g. a mobile terminal or station, a wireless terminal, a user equipment, a mobile phone, a computer such as e.g. a laptop, a Personal Digital Assistants (PDAs) or a tablet computer etc.

The multiple mesh networks 100 may further comprise one or more Network Management Service (NMS) which are related to, or attached to each mesh network 110, 120, 130, e.g. NMS 160 associated with the first network 110, NMS 170 associated with the second network 120 and NMS 180 associated with the third network 130. An NMS is a node to perform different network management functions e.g., related to nodes associating or disassociating with a network. The multiple mesh networks 100 may further comprise a mesh node 140 and a mesh node 141. The mesh nodes 140, 141 may belong to either the first network 110, the second network 120 or the third network 130.

The multiple mesh networks 100 further comprises a Brokering Service 150. The Brokering Service 150 may communicate with the first, second and third network 110, 120, 130 through their respective NMS 160, NMS 170 and NMS 180.

Figure 2:
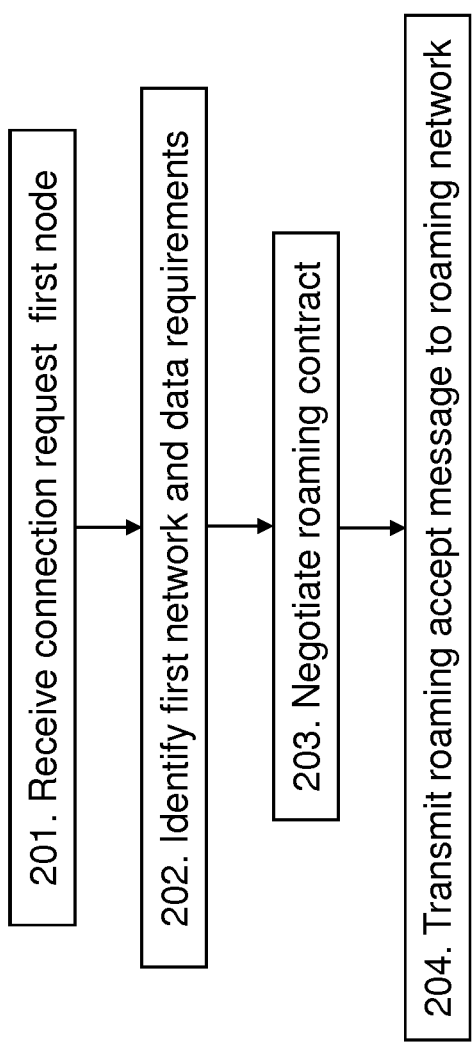
FIG. 2 is a flowchart depicting one embodiment of a brokering service method.

Embodiments are described below for a case where a first node, e.g. the network node 111, is detached from its home network, i.e. the first network 110. This means that the connection between the network nodes 111 and 112 and the connection between the network nodes 111 and 114 are "broken" or failed. In order for a node in a mesh network to function without its home network, mesh roaming is required between multiple mesh networks. In order to facilitate such roaming, a roaming brokering service which is able to interface with the multiple mesh networks and handle roaming requests is provided herein. Example of embodiments of a method performed by the brokering service 150 for assisting the first node 111 to roam in the multiple mesh networks 100 will now be described with reference to FIG. 2. The method comprises the following actions, which actions may be taken in any suitable order.

Action 201

The brokering service 150 receives a connection request associated with the first node 111 and the first network 110.

According to one embodiment, the first node 111 finds a connection to a mesh node 140. The mesh node 140 may belong to the second network 120, then the second network 120 may be a roaming network for the first node 111. The connection request is therefore sent by the first node 111 via the mesh node 140 and the second network 120 to the brokering service 150.

Action 202

The brokering service 150 identifies the first network 110 and data requirements for the first node 111. In order for the brokering service 150 to handle the roaming, it needs to know the home network of the first node 111 and its data requirements. This may be done by that the first node 111 transmits home Public Land Mobile Network (home PLMN) information and its capabilities or service used in a message to the brokering service 150, and also the data requirements, in terms of packet size, packet periodicity, latency requirements, amount of the data and other Quality of Service (QoS) etc. are included in the message.

Action 203

The brokering service 150 negotiates a roaming contract between the first NMS 160 associated with the first network 110 and at least a second NMS 170 associated with the second network 120.

According to some embodiments, the operators of the home network and the first roaming network, i.e. the second network 120, differs and a fee is charged by the operator of the second network 120 in order for the first node 111 to connect through the second network 120. Therefore the brokering service 150 needs to negotiate a roaming contract between the first Network 110 and the second network 120.

According to some embodiments, the first node may identify multiple available roaming networks. For example, the first node 111 finds a connection to a mesh node 141 and the mesh node 141 may belong to a third network 130, which third network 130 may be a roaming network for the network node 111. Then the brokering service 150 negotiates a roaming contract between the first NMS 160 and a third NMS 180 associated with the third network 130.

Action 204

After the negotiations between the first network 110 and the second or third network 120,130, the brokering service 150 may decide the preferred roaming network for the first node 111 to connect to, i.e. the roaming contract is established with either the second network 120 or the third network 130. Then the brokering service 150 transmits a roaming accept message to the second NMS 170 of the second network 120 in case the roaming contract is established with the second network 120, or transmits a roaming accept message to the third NMS 180 of the third network 130 in case the roaming contract is established with the third network 130.

According to some embodiments, the brokering service may also forward necessary information for allowing secure tunneling of data to and from the first node 111 through the roaming network to the server of the first node 111. For example, the roaming accept message may comprise a public key obtained from the first network 110 for the first node 111.

Figure 3:
FIG. 3 is a flowchart depicting different embodiments of a brokering service method.

According to some embodiments relating to Action 203 described above, negotiating a roaming contract between the first NMS 160 of the first network 110 and the second NMS170 of the second network 120 or the third NMS 180 of the third network 130 may comprise different actions depending on which parameters are considered. These actions will now be described in the following with reference to FIG. 3, which actions may be taken in any suitable order and be combined in any suitable way.

Action 301

As discussed above, the operators of the home network and the roaming network may differ and a fee is charged by the operator of the roaming network in order for the first node 111 to connect through the roaming network. Furthermore, radio communications in different roaming networks may use different frequency bands both licensed or unlicensed. For instance if a majority of links between intermediate nodes to a gateway node in a mesh network use high quality links, i.e. licensed spectrum with guaranteed Quality of Service (QoS), the roaming cost may be higher than other mesh networks using fewer high quality links, or using unlicensed spectrum between intermediate nodes to its gateway node. This implies that roaming costs may differ significantly from one network to another. Therefore the brokering service 150 needs to evaluate and compare roaming costs for different available roaming networks. For example, the brokering service 150 evaluates the roaming costs for the second network 120 and/or the third network 130 and compares them. Further detached nodes may connect to different networks with a delay, hence this renegotiation or comparison function is necessary in this case as well.

Action 302

As discussed above, communications between respective network nodes in a mesh network may be of different RATs, the decision to choose which roaming network to use may be based on RATs used in radio communications links between nodes and respective loads for different roaming networks. Therefore the brokering service 150 evaluates and compares RATs employed in radio communications links between network nodes and respective traffic loads for the second network 120 and/or the third network 130.

Action 303

According to some embodiments, the first node 111 is still attached to its home network, i.e. the first network 110, however a metric threshold has been exceeded so it is instructed to connect through an alternative roaming network if the metric of a roaming network is smaller than that of the home network. Hence roaming request may be enabled even if a node is attached to its home network. In this case, the connection request may be sent by the first node 111 via the mesh node 140 or 141 to the brokering service 150. Then the brokering service 150 needs to evaluate and compare metrics for the first network 110 and other roaming networks, e.g. the second network 120 and/or the third network 130.

According to some embodiments, the metrics may comprise Air-Time Link Metrics, which are measures of accumulated utilization of transmission medium for the first network 110, the second network 120 and/or the third network 130.

According to some embodiments, the metrics may comprise a number of intermediate network nodes needed to be passed for the first node 111 before reaching the gateway node 113 of the first network 110, the gateway node 123 of the second network 120 and/or a gateway node 133 of the third network 130. If the number of intermediate nodes is much larger in the home network than in the roaming network, e.g. the second network 120, then the brokering service 150 instructs the node 111 to connect through the second network 120.

In other embodiments, loads and frequency bands for the home network and for the different roaming networks may be included in the metrics, i.e. the brokering service 150 compares loads and frequency bands of the first network 110, the second network 120 and/or the third network 130. Usually licensed bands have higher cost but better reliability than unlicensed bands. Furthermore, current loads on respective nodes in different mesh networks may be different and may introduce different costs, e.g. costs are typically higher if the mesh network is heavily loaded.

According to some embodiments, when the brokering service 150 evaluates and compares metrics for the first network 110 and for the different roaming networks, e.g. the second network 120 and/or the third network 130, amount of data to be transmitted from the first node 111 may be taken into account.

In summary, different actions performed by the brokering service 150 discussed above allow the brokering service 150 negotiating a roaming contract, e.g. the lowest price or the best performance, for a roaming service between several roaming networks and the home network. Furthermore connectivity and reliability are important parameters for all kinds of mesh networks. For example, sensor devices or nodes in a sensor mesh network are likely to be found in locations where radio conditions are poor such as in basements or in applications involving transportation such as shipping, so it happens often that sensor devices or nodes are detached from its home network. By allowing for roaming, detached nodes may connect to their servers through other mesh networks thus increasing connectivity and reliability.

Figure 4:
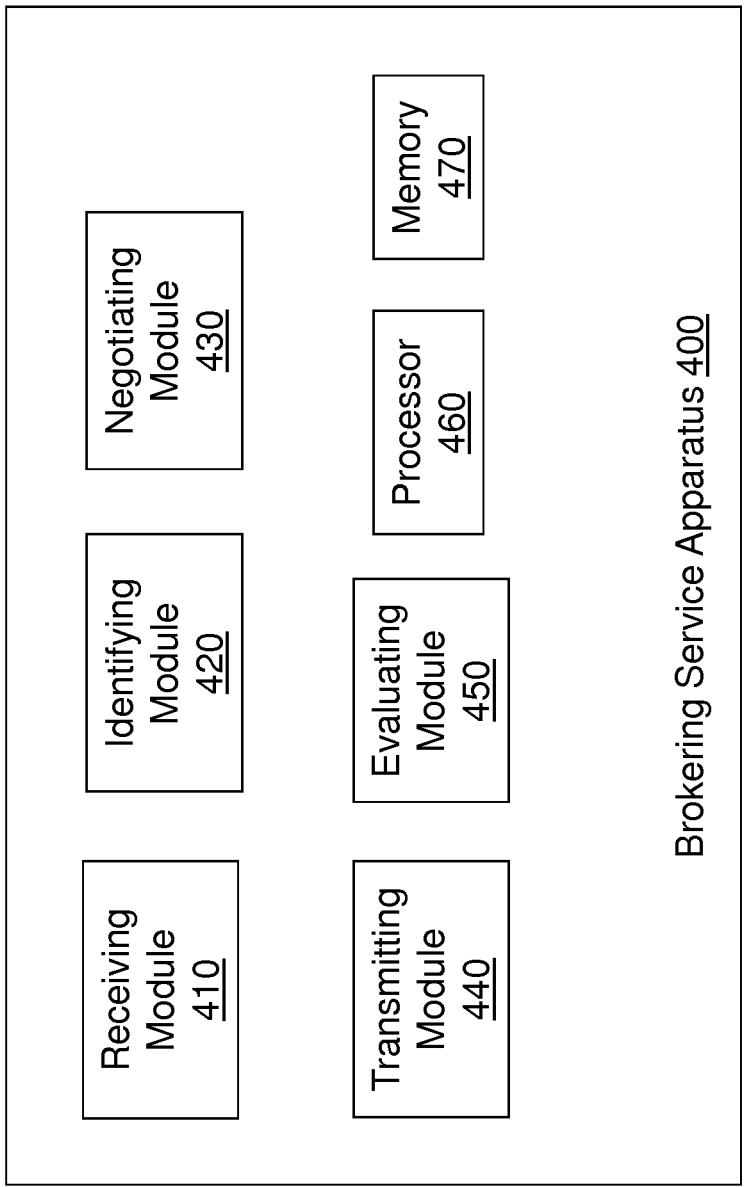
FIG. 4 is a schematic block diagram illustrating embodiments of a brokering service apparatus.

To perform the method actions in the brokering service 150 for assisting the first node 111 to roam in the multiple mesh networks 100, described above in relation to FIGS. 2-3, the brokering service 150, may be implemented in a server, on a virtual machine hosted with an Infrastructure-as-a-Service (IaaS) provider, as a Software-as-a-Service (SaaS), or a device shown as a brokering service apparatus 400 in FIG. 4. The brokering service apparatus 400 may comprise the following circuits or modules as depicted in FIG. 4. As mentioned above, the multiple mesh networks 100 comprises a first network 110 comprising a first node 111 and a gateway node 113 and a second network 120 comprising a gateway node 123. The multiple mesh networks 100 further comprises a mesh node 140, the mesh node 140 may belong to either the first network 110, the second network 120 or a third network 130.

The brokering service apparatus 400 is configured to, by means of a receiving module 410 configured to, receive a connection request associated with the first node 111 and the first network 110. The connection request is sent by the first node 111 via the mesh node 140.

The brokering service apparatus 400 is further configured to, by means of a identifying module 420 configured to, identify the first network 110 and data requirements for the first node 111.

The brokering service apparatus 400 is further configured to, by means of a negotiating module 430 configured to, negotiate a roaming contract between a first Network Management Service, NMS 160 associated with the first network 110 and at least a second NMS 170 associated with the second network 120.

When the roaming contract is established, the brokering service apparatus 400 is further configured to, by means of a transmitting module 440 configured to, transmit a roaming accept message to at least the second NMS 170 of the second network 120.

According to some embodiments, the mesh node 140 may belong to the third network 130, the brokering service apparatus 400 is further configured to negotiate a roaming contract between the first NMS 160 and a third NMS 180 associated with the third network 130. When the roaming contract is established, the brokering service apparatus 400 is configured to transmit a roaming accept message to the third NMS 180 of the third network 130.

According to some embodiments, when the brokering service apparatus 400 is configured to negotiate a roaming contract, it is further configured to, by means of a evaluating module 450 configured to, evaluate and compare roaming costs for the second network 120 and/or the third network 130.

According to some embodiments, the brokering service apparatus 400 may be configured to evaluate and compare Radio Access Technologies, RATs employed in radio communications links between network nodes and respective traffic loads for the second network 120 and/or the third network 130.

According to some embodiments, the brokering service apparatus 400 may be further configured to evaluate and compare metrics for the first network 110, the second network 120 and/or the third network 130.

The metrics may comprise Air-Time Link Metrics, which are measures of accumulated utilization of transmission medium for the first network 110, the second network 120 and/or the third network 130.

The metrics may comprise a number of intermediate network nodes needed to be passed for the first node 111 before reaching the gateway node 113 of the first network 110, the gateway node 123 of the second network 120 and/or a gateway node 133 of the third network 130.

The metrics may comprise loads and frequency bands of the first network 110, the second network 120 and/or the third network 130.

According to some embodiments, the brokering service apparatus 400 is further configured to evaluate and compare metrics for the first network 110, the second network 120 and/or the third network 130, based on amount of data to be transmitted from the first node 111.

Those skilled in the art will appreciate that the receiving module 410, identifying module 420, negotiating module 430, transmitting module 440 and evaluating module 450 described above may be referred to one module, a combination of analog and digital circuits, one or more processors, such as processor 460, depicted in FIG. 4, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The brokering service apparatus 400 may further comprise a memory 470 comprising one or more memory units. The memory 470 is arranged to be used to store information, e.g. network information, cost information, loads information, public key information or other measurements and data, as well as configurations to perform the methods herein when being executed in the brokering service apparatus 400.

The embodiments herein for the brokering service for assisting the first node 111 roaming in the multiple mesh networks 100 may be implemented through one or more processors, such as the processor 460 in the brokering service apparatus 400 together with computer program code for performing the functions and actions of the embodiments herein. The program code mentioned above may also be provided as a computer program product, for instance in the form of a data carrier carrying computer program code for performing the embodiments herein when being loaded into the brokering service apparatus 400. One such carrier may be in the form of a CD ROM disc. It is however feasible with other data carriers such as a memory stick. The computer program code may furthermore be provided as pure program code on a server and downloaded to the brokering service apparatus 400. Further, the embodiments herein for the brokering service may run on a server implemented anywhere in a network, including but not limited to the same machine or server as the NMS 160, NMS 170 and NMS 180, or run in the cloud on a virtual machine hosted with an IaaS, or as a SaaS.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for assisting a first node to roam in multiple mesh networks,
    wherein the multiple mesh networks comprise a first network comprising the first node and a first gateway node, and a second network comprising a second gateway node, the multiple mesh networks further comprising a mesh node,
    wherein the mesh node belongs to either the first network, the second network or a third network, the method comprising:
    receiving a connection request associated with the first node and the first network,
    wherein the connection request is sent by the first node via the mesh node;
    identifying the first network and data requirements for the first node, in response to receiving the connection request;
    negotiating a roaming contract between a first Network Management Service (NMS) associated with the first network and at least a second NMS associated with the second network,
    wherein said negotiating is based upon the data requirements for the first node; and
    upon establishment of the roaming contract, transmitting a roaming accept message to at least the second NMS of the second network
    wherein negotiating a roaming contract between the first NMS of the first network and at least the second NMS of the second network comprises evaluating and comparing metrics for the first network and the second network, and
    wherein the metrics comprises loads and frequency bands of the first network and the second network.

2. The method of claim 1
    wherein the mesh node belongs to the third network, and
    wherein said negotiating a roaming contract comprises negotiating a roaming contract between the first NMS and a third NMS associated with the third network,
    wherein said establishment of the roaming contract is responsive to determining that the second network is preferred over the third network.

3. The method of claim 1,
    wherein negotiating a roaming contract between the first NMS of the first network and at least the second NMS of the second network comprises evaluating and comparing roaming costs for the second network.

4. The method of claim 1,
    wherein negotiating a roaming contract between the first NMS of the first network and at least the second NMS of the second network comprises evaluating and comparing Radio Access Technologies (RATs) employed in radio communications links between network nodes and respective traffic loads for the second network.

5. The method of claim 1,
    wherein the metrics comprises Air-Time Link Metrics, which are measures of accumulated utilization of transmission medium for the first network and/or the second network.

6. The method of claim 1,
    wherein the metrics comprises a number of intermediate network nodes needed to be passed for the first node before reaching the first gateway and/or the second gateway node.

7. The method of claim 1,
    wherein evaluating and comparing metrics for the first network and the second network is further based on an amount of data to be transmitted from the first node.

8. The method of claim 1,
    wherein the roaming accept message comprises a public key obtained from the first network for the first node.

9. A brokering service apparatus for assisting a first node to roam in multiple mesh networks,
    wherein the multiple mesh networks comprises a first network comprising the first node and a first gateway node, and a second network comprising a second gateway node, the multiple mesh networks further comprising a mesh node,
    wherein the mesh node belongs to either the first network, the second network or a third network, and
    wherein the brokering service apparatus comprises a processor, and memory operatively coupled to the processor and storing software or firmware or both, for execution by the processor, whereby the brokering service apparatus is configured to:
    receive a connection request associated with the first node and the first network,
    wherein the connection request is sent by the first node via the mesh node;
    identify the first network and data requirements for the first node, in response to receiving the connection request;
    negotiate a roaming contract between a first Network Management Service (NMS) associated with the first network and at least a second NMS associated with the second network,
    wherein said negotiating is based upon the data requirements for the first node; and
    upon establishment of the roaming contract, transmit a roaming accept message to at least the second NMS of the second network
    wherein to negotiate a roaming contract between the first NMS the first network and at least the second NMS of the second network comprises evaluating and comparing metrics for the first network and the second network, the metrics comprising loads and frequency bands of the first network and the second network.

10. The brokering service apparatus of claim 9,
    wherein the mesh node belongs to the third network, and
    wherein the brokering service apparatus is configured to negotiate a roaming contract between the first NMS and a third NMS associated with the third network, and wherein the brokering service apparatus is configured to establish the roaming contract responsive to determining that the second network is preferred over the third network.

11. The brokering service apparatus of claim 9,
wherein to negotiate a roaming contract between the first NMS of the first network and at least the second NMS of the second network comprises:
to evaluate and compare roaming costs for the second network.

12. The brokering service apparatus of claim 9,
wherein to negotiate a roaming contract between the first NMS of the first network and at least the second NMS of the second network comprises:
to evaluate and compare Radio Access Technologies (RATs) employed in radio communications links between network nodes and respective traffic loads for the second network.

13. The brokering service apparatus of claim 9,
wherein the metrics comprises Air-Time Link Metrics, which are measures of accumulated utilization of transmission medium for the first network and/or the second network.

14. The brokering service apparatus of claim 9,
wherein the metrics comprises a number of intermediate network nodes needed to be passed for the first node before reaching the first gateway node of and/or the second gateway node.

15. The brokering service apparatus of claim 9,
wherein to evaluate and compare metrics for the first network and the second network is further based on amount of data to be transmitted from the first node.

16. The brokering service node of claim 9,
wherein the roaming accept message comprises a public key obtained from the first network for the first node.

* * * * *